US009685089B2

(12) United States Patent
Paczan et al.

(10) Patent No.: US 9,685,089 B2
(45) Date of Patent: Jun. 20, 2017

(54) COMMERCIAL AND GENERAL AIRCRAFT AVOIDANCE USING ACOUSTIC PATTERN RECOGNITION

(71) Applicant: Amazon Technologies, Inc., Seattle, WA (US)

(72) Inventors: Nathan Michael Paczan, Seattle, WA (US); Daniel Buchmueller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 187 days.

(21) Appl. No.: 14/569,183

(22) Filed: Dec. 12, 2014

(65) Prior Publication Data

US 2016/0247405 A1  Aug. 25, 2016

(51) Int. Cl.
*G01C 21/12* (2006.01)
*G08G 5/00* (2006.01)
(Continued)

(52) U.S. Cl.
CPC .............. *G08G 5/0039* (2013.01); *G01S 5/18* (2013.01); *G01S 15/02* (2013.01); *G05D 1/101* (2013.01);
(Continued)

(58) Field of Classification Search
CPC ...... G09G 5/0039; G05D 1/101; G05D 1/104; G01N 29/11; G01S 5/18; G01S 15/60;
(Continued)

(56) References Cited

U.S. PATENT DOCUMENTS 3,671,927 A * 6/1972 Proudian ............... G01S 13/951
367/94
3,745,520 A * 7/1973 Barret ..................... G01S 15/60
367/101
(Continued)

FOREIGN PATENT DOCUMENTS

EP    2177966 A2    4/2010

OTHER PUBLICATIONS

The PCT Search Report and Written Opinion mailed Mar. 9, 2016 for PCT application No. PCT/US2015/065352, 11 pages.
(Continued)

*Primary Examiner* — Yuri Kan
(74) *Attorney, Agent, or Firm* — Lee & Hayes, PLLC

(57) ABSTRACT

This disclosure is directed to a detection and avoidance apparatus for an unmanned aerial vehicle ("UAV") and systems, devices, and techniques pertaining to automated object detection and avoidance during UAV flight. The system may detect objects within the UAV's airspace through acoustic, visual, infrared, multispectral, hyperspectral, or object detectable signal emitted or reflected from an object. The system may identify the source of the object detectable signal by comparing features of the received signal with known sources signals in a database. The features may include, for example, an acoustic signature emitted or reflected by the objet. Furthermore, a trajectory envelope for the object may be determined based on characteristic performance parameters for the object such as cursing speed, maneuverability, etc. The UAV may determine an optimized flight plan based on the trajectory envelopes of detected objects within the UAV's air-space.

20 Claims, 11 Drawing Sheets

(51) Int. Cl.
*G01S 5/18* (2006.01)
*G05D 1/10* (2006.01)
*G08G 5/04* (2006.01)
*G01S 15/02* (2006.01)
*G10K 11/34* (2006.01)
*H04L 29/08* (2006.01)

(52) U.S. Cl.
CPC ......... *G08G 5/0013* (2013.01); *G08G 5/0069* (2013.01); *G08G 5/0078* (2013.01); *G08G 5/045* (2013.01); *G10K 11/34* (2013.01); *H04L 67/1074* (2013.01)

(58) Field of Classification Search
CPC ......... G01S 5/28; G05S 13/951; G01C 21/20; G01C 21/12; G01C 23/005; H04B 7/18506; G06F 17/141; H04W 36/08; F26B 25/22; B60Q 9/006; G08G 1/163; A61B 5/14532
See application file for complete search history.

(56) References Cited

U.S. PATENT DOCUMENTS

| | | | |
|---|---|---|---|
| 5,581,250 A | 12/1996 | Khvilivitzky | |
| 6,804,607 B1 | 10/2004 | Wood | |
| 8,897,770 B1 | 11/2014 | Frolov et al. | |
| 9,310,222 B1* | 4/2016 | Suiter | G01C 23/005 |
| 2002/0033769 A1 | 3/2002 | Bass et al. | |
| 2004/0167718 A1* | 8/2004 | Hoenes | B60Q 9/006 |
| | | | 701/301 |
| 2005/0117454 A1* | 6/2005 | Millikin | G01S 5/28 |
| | | | 367/127 |
| 2005/0230563 A1* | 10/2005 | Corcoran, III | G05D 1/104 |
| | | | 244/175 |
| 2006/0058931 A1 | 3/2006 | Ariyur et al. | |
| 2009/0257314 A1* | 10/2009 | Davis | G01S 5/18 |
| | | | 367/125 |
| 2010/0100269 A1* | 4/2010 | Ekhaguere | G05D 1/101 |
| | | | 701/26 |
| 2010/0114633 A1 | 5/2010 | Sislak et al. | |
| 2010/0238956 A1 | 9/2010 | Preuss et al. | |
| 2011/0106440 A1* | 5/2011 | Adradi | G01C 21/12 |
| | | | 701/532 |
| 2011/0137498 A1 | 6/2011 | Suzuki | |
| 2011/0199098 A1* | 8/2011 | Bense | F26B 25/22 |
| | | | 324/637 |
| 2011/0299732 A1 | 12/2011 | Jonchery et al. | |
| 2013/0317673 A1* | 11/2013 | Leroy | H04B 7/18506 |
| | | | 701/14 |
| 2014/0202248 A1* | 7/2014 | Read | G01N 29/11 |
| | | | 73/583 |
| 2015/0170523 A1* | 6/2015 | La Civita | G01C 21/20 |
| | | | 701/120 |
| 2015/0302858 A1 | 10/2015 | Hearing et al. | |
| 2015/0327136 A1* | 11/2015 | Kim | H04W 36/08 |
| | | | 370/331 |
| 2016/0054443 A1* | 2/2016 | Mallaghan | G08G 1/163 |
| | | | 701/500 |
| 2016/0171896 A1 | 6/2016 | Buchmueller et al. | |
| 2016/0247512 A1* | 8/2016 | Duong | G06F 17/141 |
| 2016/0310051 A1* | 10/2016 | Brister | A61B 5/0002 |

OTHER PUBLICATIONS

Office action for U.S. Appl. No. 14/569,233, mailed on Nov. 23, 2016, Paczan et al., "Commercial and General Aircraft Avoidance using Multi-spectral wave Detection", 11 pages.
Office action for U.S. Appl. No. 14/569,125, mailed on Sep. 8, 2016, Buchmueller et al., "Commercial and General Aircraft Avoidance using Light Pattern Detection", 16 pages.

* cited by examiner

COMMERCIAL AND GENERAL AIRCRAFT AVOIDANCE USING ACOUSTIC PATTERN RECOGNITION

BACKGROUND

Unmanned Aerial Vehicles (UAV) have become relatively common among hobbyists, commercial entities (e.g., aerial photography), and military users. These aerial vehicles generally operate at low altitudes where air traffic is busiest and most unpredictable. For example, take-off and landing of commercial aircraft, test flights, private pilot activity, hobbyists, balloons and blimps, aerial advertising, float planes, emergency responders and other UAVs may be more likely to be present within the UAV's airspace. A UAV, operating autonomously or under the control of an operator must actively avoid interference with other objects, both moving and stationary, that are present within the UAV's airspace.

Aircraft collision avoidance systems (ACAS) and aircraft separation assurance systems (ASAS) are intended to operate independently of a ground-based air traffic controllers. Several systems are commonly used onboard manned aircraft to avoid collisions and maintain aircraft separation, for example, airborne radar and traffic collision avoidance systems. However, these systems are often heavy, expensive, and/or rely on active interrogation of the transponder of aircraft in the vicinity of the aircraft conducting the interrogation. Lighter systems are generally passive and rely on transmission of transponder information from nearby aircraft, thereby only passively preventing an interaction between aircraft in the vicinity of the transmitting air vehicle. In some instances, an object may not be equipped with a transponder and therefore would be invisible to passive detection using these techniques. Additionally, in the busiest and most unpredictable airspace, i.e., low altitudes, manned air vehicles typically rely on the pilot and Air Traffic Controllers to prevent interactions and maintain adequate separation between aircraft.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6B represents multiple UAVs detecting the same aircraft as in FIG. 6A while maintaining network communication between the UAVs.

DETAILED DESCRIPTION

Overview

Figure 1:
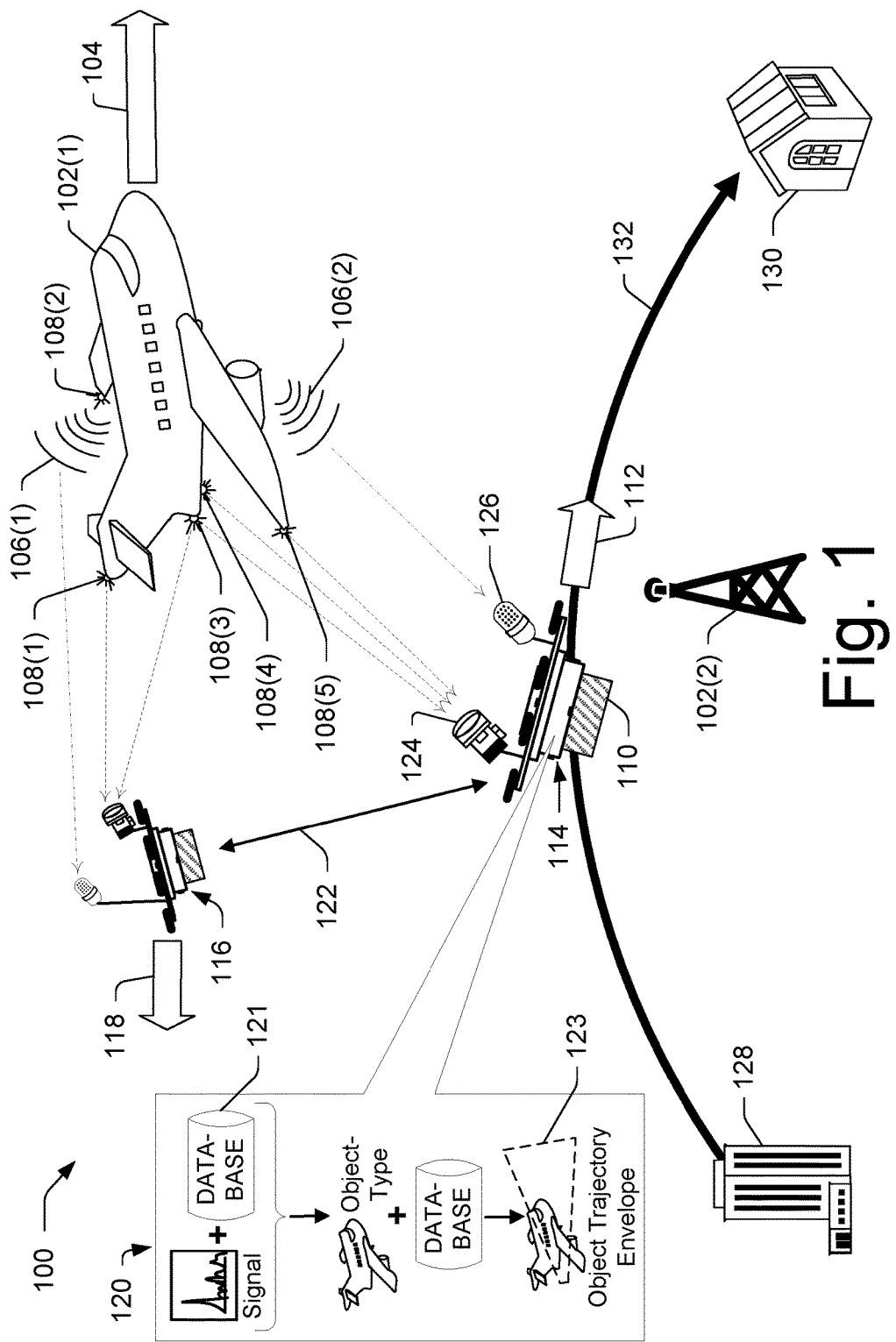
FIG. 1 is a schematic diagram of an illustrative unmanned aerial vehicle (UAV) airspace comprising partly of a UAV, moving and stationary objects, UAV sensors, and a UAV flight-management system to dynamically update a UAV flight plan.

This disclosure is directed to an unmanned aerial vehicle ("UAV") and systems, devices, and techniques pertaining to object detection and/or object separation and avoidance during operation of the UAV. The UAV may be used to deliver cargo, e.g., from a fulfillment center to one or more destinations, and may then return to the fulfillment center or other location to retrieve other cargo for another transport to one or more additional destination. The UAV may include a plurality of sensors including, for example, one or more cameras capable of capturing one or more wavelengths of electromagnetic energy including infrared and/or visual, an acoustic sensor (e.g., a microphone, etc.), and/or multispectral sensor for the detection and autonomous avoidance of objects during the UAV's operation. The UAV may also include one or more transmitters, such as an acoustic transmitter.

The UAV may interrogate data captured by the sensors to determine a source, source trajectory, and source operating characteristics (e.g., a speed and/or acceleration). The UAV may also identify an object-type associated with the source of the transmission (e.g., stationary object, fixed wing air vehicle, rotorcraft, blimp/balloon, etc.) and likelihood of trajectory changes of the source by analyzing captured signal data over a period of time. From the object identification and likelihood of trajectory change, the UAV may then determine a trajectory envelope for individual ones of the one or more objects detected by the UAV. The UAV may also compare its own flight plan to the one or more trajectory envelopes and update its own flight plans to minimize or eliminate the likelihood of interaction with the one or more objects. The object avoidance system may be used to continuously ensure safe travel for the UAV and objects within UAV's airspace throughout the UAV's operation.

In various embodiments, an object detection and avoidance system may include one or more monitoring zones. In one implementation, a UAV may actively monitor one or more air-space regions, including an interior active monitoring zone nearest to the UAV. The UAV may also monitor a detection zone beyond the active monitoring zone and to the maximum detection limits of the UAV's sensors. Beyond a detection zone, the UAV may not monitor objects or object locations. However, the UAV may exchange information about objects with one or more nearby UAVs to effectively increase the UAV's detection limit and/or detection zone perimeter.

When an object is present in the outermost monitored airspace region, the detection zone, the UAV may constantly monitor low-fidelity operating characteristics of the object such as relative position and/or trajectory. When an object moves into the innermost airspace region, the active monitoring zone, the UAV may constantly monitor characteristics of the object with a higher degree of fidelity. For example, the UAV may maintain at least an active position of the object, a trajectory of the object, and/or a trajectory envelope for the detected object.

In accordance with one or more embodiments, the UAV may be equipped with a flight management system comprising a processor, computer readable media, one or more sensors, one or more output devices, and a wireless communications component. The flight management systems may receive and analyze sensor data representing signals from the UAV's airspace. The flight management system may compare the analyzed data to database information to identify the source of the signals. The flight management system may determine operating characteristics of the identified object based in part on changes in the received signals. Further, the flight management system may determine a trajectory envelope for one or more detected objects based at least partly on the performance parameters associated with the object by an object performance parameter database. The flight management system may also maintain a dynamic UAV flight plan and update the plan to reduce or eliminate the likelihood of interference with one or more objects operating within the UAV's airspace.

In some embodiments, an object performance parameter database may maintain information characterizing performance parameters associated with one or more objects within the UAV's airspace. For example, the object parameter databases may include characteristics of common or likely to be encountered objects (e.g., aircraft, stationary objects, etc.) within any given airspace. Sample characteristics may include, without limitation, rate of climb and/or rate of decent, an object's operating ceiling, range, speed, maneuverability, and/or a scalable trajectory envelope. Furthermore, the characteristics of the objects in the performance parameter database may organized into one or more classes of aircraft such as fixed wing, rotorcraft, blimp and/or balloon, experimental aircraft, etc.

Additionally, the object performance parameter database may include a scalable trajectory envelope for each object. A scalable trajectory envelope may be a three-dimensional geometry that describes that probability of trajectory change of the object based on the performance parameters associated with the object and stored in the performance parameter database. Further, the object's current operating characteristics such as the position relative to the UAV and/or the object's determined trajectory, including speed, may be used by the flight management system to scale the scalable trajectory envelope associated with the object and determine a trajectory envelope that represents the object's probability of trajectory change. Additionally, the flight management system may update its own flight plan to minimize interference with the object based on the scaled trajectory envelope.

In additional embodiments, a UAV's flight management system may determine a trajectory envelope for one or more objects detected in a UAV's airspace. A trajectory envelope may be determined based at least partly on the object's operating characteristics and/or a probability of trajectory change of the object. Furthermore, the flight management system may determine a probability of interaction between the UAV and the object based at least partly on the current trajectory of the detected object, the object's performance parameters, and one or more performance parameters associated with the object. The probability of interaction may vary at greater distances from the object and/or over time depending on the object's current operating characteristics and/or performance parameters associated with the object.

In some embodiments, the UAV may capture a plurality of images representing the UAV's airspace and analyze the captured images for indications of objects. An indication may be the profile of an aircraft and/or one or more navigation or anti-collision lights on the aircraft. Additionally, an indication may include the on-off frequency or rotational frequency of one or more identified aircraft lights. The UAV may analyze collected images for indications of similar lighting schemes or similar light flashing frequency and/or duration and, with reference to an object database, identify the object. Furthermore, object performance parameters may be determined from changes in the position of an identified object within the plurality of images relative to the UAV.

In further embodiments, the UAV may capture acoustic signals representing the UAV's airspace and analyze the captured acoustic signals over a period of time to identify the object or objects emitting or reflecting the acoustic signals and/or the change in the object's trajectory (e.g., direction and/or speed). The captured acoustic signal may represented as a spectrogram and identify portions of the spectrogram representing a fingerprint. The fingerprint may then be used to identify the object. Furthermore, the object's operating parameters (e.g., trajectory and/or speed, etc.) based on changes in the acoustic signal over a period of time. Additionally a trajectory envelope may be determined to describe the likelihood of the object interacting with the UAVs' current flight plan. If an interaction is probably or even possible, the UAV's flight plan may be updated.

In still some embodiments a UAV may communicate with one or more nearby UAVs via a peer-to-peer (P2P) network to share sensor-captured information. A nearby UAV may have additional information about an object in shared airspace. One or all UAVs in the network may supplement captured data with shared data to improve the accuracy of object detection and classification.

In still further embodiments, one or more UAVs may maintain a communication network to extend the detection limit of any individual UAVs within the network. A sensor may have an inherent instrument detection limit creating a maximum object detection distance from the UAV. However, a first UAV may maintain a communication link with a first plurality of nearby UAVs. Furthermore, an individual UAV of the first plurality may be either within or outside of the first UAV's detection limits. In turn, each member of the first plurality of UAVs may maintain a communication link with one or more additional UAVs from within a second plurality of UAVs. The first UAV may capture information related to a detected object within its own detection limits and share the captured information with one or more UAVs of the first plurality, including the second UAV. The one or more UAVs of the first plurality may then, in turn, share the captured information with the second plurality and/or utilize the information for object detection. Thereby, the captured information shared over the communication network may be used to improve the accuracy of object detection and classification and extend the determination limits of individual UAVs within the network.

The techniques, apparatuses, and systems described herein may be implemented in a number of ways. Example implementations are provided below with reference to the following figures.

FIG. 1 is a schematic diagram of an illustrative UAV's airspace 100 partly including a UAV 114; moving and stationary objects 102; UAV sensors, including for example an optical sensor 124 and/or an acoustic sensor 126; and an UAV flight-management system 120 to dynamically update a UAV flight plan 132. The airspace 100 may be, for example, the airspace between the UAV's base location 128 and one or more destination locations 130. The UAV's airspace 100 may also include airspace associated with UAV loading (i.e., where the UAV loads a payload 110 for delivery), tack-off, and/or delivery). The relative position of the one or more objects 102 and one or more nearby UAVs 116 is not limiting, and thus they may be at any location relative to the UAV 114 within the UAV's airspace 100.

The UAV's airspace 100 may include a plurality of objects 102. The objects may include a myriad of object types. For example, as shown in FIG. 1, an object 102(1) may be a fixed wing aircraft. However, an object 102 may also include any type of air vehicle, such as a nearby UAV 116, a rotorcraft, and/or blimp or balloon. Additionally, an object 102 may be a stationary object such as a building or factory, antenna 102(2), high voltage power lines, control tower, runway or runway lighting, bridge, wildlife (e.g., birds, etc.), tree, or other natural formation such as a mountain or rock formation, for example.

An object 102 may be associated with one or more operating characteristics 104 such as, for example: trajectory, speed, and/or acceleration. Further, an object 102 may generate one or more capturable indications. Object generated indications may refer to energy waves created, reflected, and/or emitted by an object, including acoustic or electromagnetic energy (i.e., visible light 108 and infrared frequencies) and/or acoustic signals 106, for example. An object 102 may also reflect and/or emit unique frequencies throughout the electromagnetic spectrum depending on the materials or systems that make up an object 102. For example, hyperspectral imaging or multispectral imaging may be used to determine the composition of an object 102 by capturing specific frequencies of reflected electromagnetic energy. In one embodiment, the polymer of the paint or similar coating may produce a unique spectral fingerprint from which an object 102 may be identified.

Furthermore, a UAV may house a flight management system 120 to direct the signal capture and analysis; object detection, and modifications to the UAV's flight plan. An embodiment of a flight management system 120 is described in further detail below with respect to FIG. 3. For example, the flight management system 120 may access object indications (e.g., signals generated from sound 106 caused by the object, signals generated from light 108 emitted from the object) and process the indications into a format suitable for analysis. For example, acoustic signals 106 may be formatted into a spectrogram representing the frequency change of the signal over time. The flight management system 120 may then identify features of the signal representative of the object and compare those features to a database of features associated with known objects. The flight management system may thereby positively identify the object associated with the indications. The flight management system may then associate performance parameters from a database 121 with the identified object to determine an operating envelope 123 or probability of trajectory change.

Additionally, the flight-management system 120 may determine the distance between the UAV 114 and one or more identified objects 102. The distance may be determined by range-finding techniques such as, without limitation, a range-finding focusing mechanism, a laser rangefinder, a pulse radar technique, or an ultrasonic ranging technique. The flight-management system 120 may first identify an object operating in the UAV's airspace and then determine the distance and operating characteristics of the object using range-finding techniques.

Additionally, the UAV's flight management system 120 may compare the UAV's operating characteristics 112 and current flight plan 132 to the identified object's operating envelope to determine the necessity of modification to the current flight plan 132. The flight management system 120 may update the flight plan by determining a minimum likelihood of interaction with the identified object's operating envelope as well as a maximum efficiency (fuel consumption and/or flight time) for delivery of the payload 110.

The UAV 114 may maintain a communication network 122 such, as a peer-to-peer network (P2P network), or similar communication interface between the UAV 114 and one or more nearby UAVs 116. The UAV 114 may utilize information gathered from nearby UAVs 116 to improve accuracy of object identification and extend the detection limits of the UAV's sensing equipment to include the detection limit of the one or more nearby UAVs 116 of the network. Additionally, data shared via the communication interface 122 may be used to triangulate the location of objects 102 over time and improve the accuracy of determined operating object characteristics 104 and/or the operating characteristics 118 of the one or more nearby UAVs 116 present within the UAVs airspace 100.

Furthermore, a flight management system 120 may maintain a dynamic flight plan 132 for the UAV 114. The dynamic flight plan 132 may describe the completed portion and/or planned portion of a flight path between the UAV's base location 128 and one or more destination locations 130. The flight management system 120 may consider fuel level, weigh of payload 110, distance to one or more of the destination locations 130, distance traveled from a base location 128, airspace congestion, etc. Furthermore, the flight management system 120 may include the location of one or more remote charging stations, suspension of operations due to airspace congestion and/or likelihood of interference with an object 102 in the UAV's airspace 100, or other unplanned destination as part of optimization of the flight plan 132.

Figure 2:
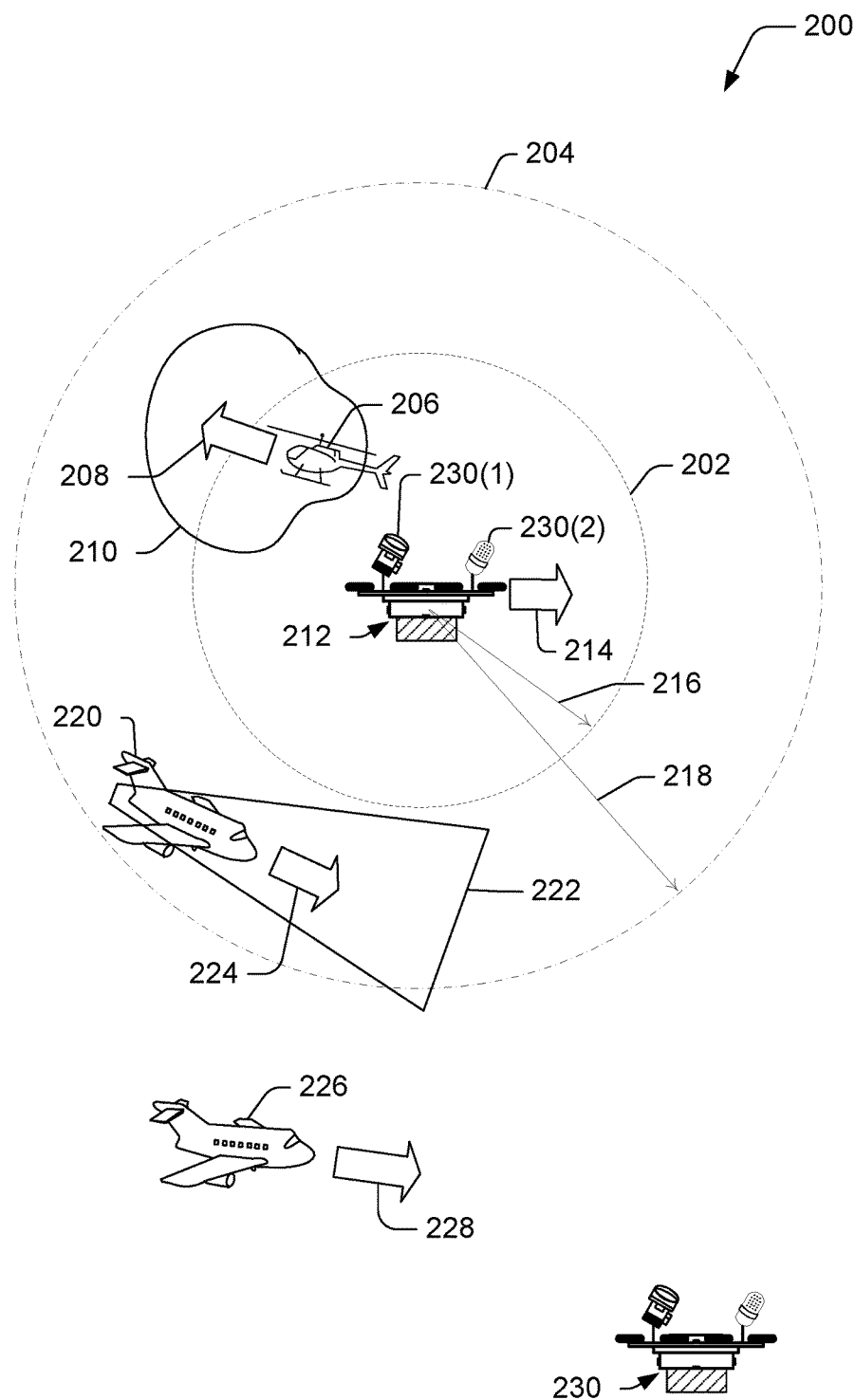
FIG. 2 is a schematic diagram of a UAV's airspace illustrative of one or more UAV detection zones, including a perimeter object detection zone and an inner active object monitoring zone.

FIG. 2 is a schematic diagram of a UAV's airspace illustrative of one or more UAV detection zones, including a perimeter object detection zone and an inner active object monitoring zone 200. In some embodiments, the UAV detection zones may include an active object monitoring zone 202 and an object detection zone 204. A UAV 212 may maintain two zones at perimeter distances 216 and 218, respectively. However, more or fewer zones may be used. The active monitoring zone 202 is maintained at a distance that it ensures safe operation of the UAV 212 relative to the UAV's operating characteristics 214 and the operating characteristics of one or more objects within the UAV's airspace 100. The perimeter distance 216 of the active monitor zone 202 may therefore vary depending on various factors. Furthermore, an object detection zone distance 218 may be maintained at the detection limits of the UAV's sensors 230. Objects operating in either the active object monitoring zone 202 or the object detection zone 204 may be detected and monitored using visual and/or acoustic signatures of the objects. For example in an acoustic detection, the UAV may receive object generated or reflected acoustic indications (i.e., sound waves from operation of an object). Additionally or alternatively, the UAV may capture visual images of the UAV's airspace, including lighting associated with one or more objects, to identify and monitor objects.

The UAV's airspace 100 may contain one or more unmonitored objects 226, one or more detected objects 220, and/or one or more actively monitored objects 206. Alternatively, any one zone or all zones within the UAV's airspace 100 may contain no objects. Furthermore, unmonitored objects 226 may be outside of the detection limits of the UAV's sensors 230. The UAV 212 may obtain unmonitored object operating characteristic 228 from one or more nearby UAV's 230 such that the one or more nearby UAV's 230 shares, via a communication interface, unmonitored object operating characteristics 228 when the object enters the UAV's detection zone 204.

The UAV 212 may monitor one or more operating characteristics 222 of objects within the object detection zone 204 such as location, speed, and/or trajectory of the object 220. In some instances, the UAV 212 may not monitor operating characteristics 228 of objects outside of the detection zone due to limitations of sensors, likelihood of interaction, and/or other reasons. Further, the UAV 212 may associate a trajectory envelope 224 with the object 220 and the UAV's flight management system may update the UAV's flight plan to avoid interaction with the trajectory envelope 224 in the future.

For objects operating in the UAV's detection zone 204 the detectable signal received from an object may be proportional to the distances between the object 220 and the UAV 212 at any point in time. Therefore, the UAV 212 may associate a trajectory envelope 224 with the object 220 that is scaled proportionally to the signal strength relative to a historical signal strength and/or a maximum scaling factor when the signal strength falls below a threshold level. Additionally, the trajectory envelope 224 may reflect a level of risk the UAV operator wishes to assume for the likelihood of interaction with other objects within the UAV's airspace 100. The resulting trajectory envelope would be a maximum relative to the determined object operating characteristics. In some cases, the UAV 212 may suspend operation to accommodate busy airspace where the UAV 212 may not determine a sufficiently risk-free flight plan.

The UAV 212 may transition to an active monitoring of an object when the object (e.g., the object 206) enters the active monitoring zone 202 and is located within the distance 216 from the UAV 212. The object 206 may also be first detected within the active monitoring zone 202. The UAV 212 may determine the object's operating characteristics 208 as well as identify the object type based on analysis of signals generated by the sensors 230 that observe the object. The UAV 212 may therefore maintain higher fidelity details of an object 206 within the active monitoring zone 202 relative to an object 220 within the detection zone 204. For example, the UAV 212 may identify the object 206 by determining the object-type based at least in part on generated signals associated with the object 206. The UAV 212 may then determine a probability of trajectory change associated with the object based at least in part on performance parameters associated with the identified object-type, such as maximum rate of climb and rate of descent (i.e., sink rate), the identified object's operating ceiling, rang, maximum speed and overall maneuverability or operating envelope. The identified object-type may be either stationary or moving, the object's operating characteristics, and determined probability of trajectory change may reflect the identified object-type. The UAV's flight management system may incorporate the higher fidelity details of the object's operating characteristics 208 to determine the object's trajectory envelope 210 and update the UAV's flight plan based at least in part on the determined trajectory envelope 210.

Figure 3:
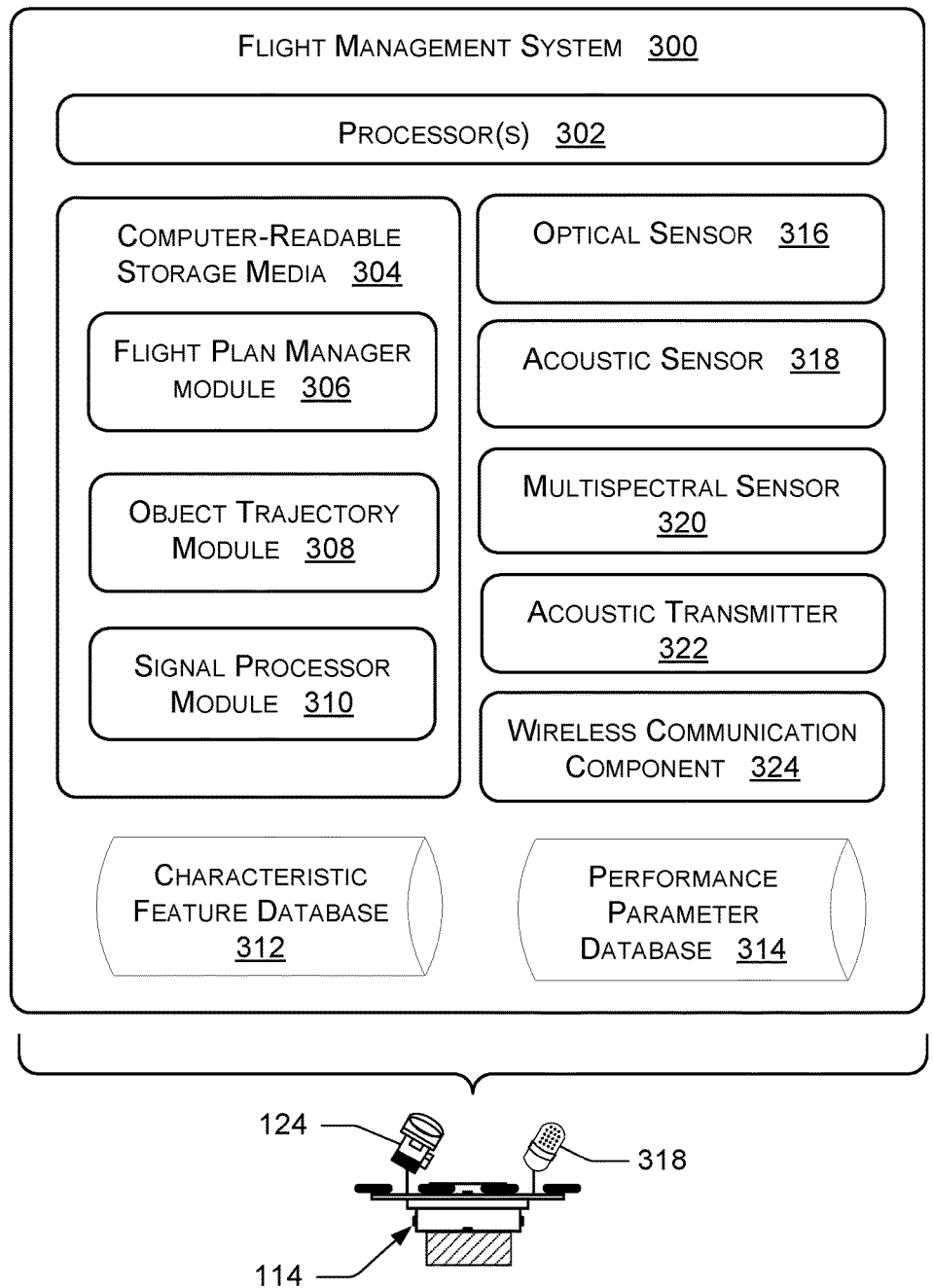
FIG. 3 is a block diagram illustrative of a UAV's flight management system comprising a processor, computer-readable media, one or more sensors, an acoustic transmitter, and wireless communication component.

FIG. 3 is a block diagram illustrative of a UAV's flight management system 300 comprising: a processor, computer-readable media, one or more sensors, an acoustic transmitter, and wireless communication component. FIG. 3 is discussed with reference to FIG. 1. A UAV 114 may house a flight management system 300. The flight management system 300 may be comprised of a processor 302, a computer-readable storage media 304, and one or more sensors including, for example, an optical sensor 316, acoustic sensor 318, and/or multispectral sensor 320. The flight management system 300 may further comprise an acoustic transmitter 322 and wireless communication component 324. Additionally, the flight management system may comprise one or more databases including, for example, a characteristic feature database 312 and a performance parameter database 314.

The computer-readable storage media 304 may include a flight plan manager module 306, an object trajectory module 308, and a signal processor module 310. Additionally, or alternatively the signal processor module 310 may be implemented, at least in part, on a remote server for analysis (e.g., uploaded and analyzed to a cloud server or dedicated server). The signal processor module 310 may obtain and process the signals captured by the one or more sensors. The signal processor module 310 may compare features in the signals to a database of known features thereby associating an object associated with the signals to a known object type (e.g., a fixed wing aircraft, or more particularly, a specific model of aircraft). The object trajectory module 308 may compare processed signals over a period of time to determine the trajectory of the object relative to the UAV 114. Furthermore, the object trajectory module 308 may receive the identified object-type from the signal processor module 310 and compare the object-type to a database of performance parameters 314 associated with a plurality of object-types. The object trajectory module 308 may receive identification of the object from the signal processor module 308, and with the object performance parameters and current operating characteristics, determine a trajectory envelope for the object.

The flight plan manager module 306 may store the UAV's current flight plan and interact with the object trajectory module 308 to update the UAV's flight plan as necessary. For example, the flight plan manager module 306 may determine a likelihood of interaction between the UAV's current flight plan 132 and the object's trajectory envelope. The flight plan manager module 306 may determine an optimized flight plan to avoid interaction with an object's trajectory envelope as well as factors such as: fuel level, payload weight, distance to one or more destination, distance traveled from a base location, airspace congestion, etc.

The optical sensor 316 may capture one or more images of the UAV's airspace (e.g., the airspace 100 shown in FIG. 1) with an imaging sensor or other type of optical sensor over time for analysis by the signal processor module 310. For example, the optical sensor 316 may capture multiple images of the UAV's airspace containing one or more objects (e.g., the objects 102 shown in FIG. 1). The signal processor module 310 may detect one or more characteristic features of the objects within the images for comparison with a characteristic feature database 312. An object is identified as a specific object-type when there is a positive match between the characteristic features of the object and one or more features in the characteristic feature database 312. For example, image analysis may detect the presence of a plurality of navigational or anti-collision lights in an arrangement (e.g., distances/spacing and/or locations) associated with a fixed wing object. The signal processor module 310 may determine characteristic features of the plurality of lights, such as spacing and/or blinking frequency or rotation frequency of the light pattern, possibly using the distance information of the UAV from the object, as discussed above. The object may be identified by a comparison between the characteristic features identified from the image and a characteristic feature database 312.

More particularly, image analysis may be used to identify common lighting patterns present on an aircraft. For example, a commercial aircraft operating in regulated airspace typically require one or more navigational lights and anti-collision lighting. Typically, navigational lighting consists of at least red and white lights on the port, or left side of the aircraft, and green and white lights on the starboard, or right side, of the aircraft. Additionally, the aircraft may have a white light at the end of the wings and on the fuselage of the aircraft and anti-collision lighting at a forward position on the fuselage of the aircraft. The signal processor module 310 may compare the identified characteristic features, such as the relative position of one or more detected lighting arrangements on the aircraft, with similar features stored in the characteristic feature database module 312 to determine the aircraft's identity. Additionally, the signal processor module 314 may determine the flashing frequency of the identified lighting arrangement with reference to a characteristic feature database module 308 to identify the aircraft 102.

Furthermore, the one or more objects may be identified by comparing visual characteristics of the one or more objects with characteristics stored in the characteristic feature database module 312. For example, if the object is a fixed wing aircraft, the signal processor module 310 may use image analysis techniques such as edge detection and feature extraction to determine that the object has an unswept-wing with a wingspan of thirty-six feet, a conventional wheeled undercarriage, an aspect ratio of 7.32, a length of twenty-seven feet, and/or a propeller. By comparing the identified characteristic features to the characteristic feature database 312, the signal processor module 310 may demine the object to be a "Cessna 172," a type of small private aircraft, or another craft within a similar class.

An acoustic sensor 318 may generate an acoustic signal based on sound generated or reflected by an object. The acoustic sensor 318 may be in the form of an array assembly of acoustic sensors. Through signal processing, directionality and/or movement of object associated with the generated acoustic signal may be determined, such as through use of beamforming techniques. Thus, processing of the generated signal may enable tracking location, orientation, and/or movement of the object, as well as determining a unique signature of the signal that indicates a classification of a type of object that is associated with the sound. Furthermore, an acoustic transmitter 322 may transmit acoustic waves that may be reflected by one or more objects operating within the airspace.

A signal processor module 310 may represent the signal as a spectrogram of signal intensity, time, and frequency. The signal processor module 310 may identify portions of the spectrogram that represent unique fingerprints of the captured acoustic signal at 1006. For example, the signal processor module 310 may identify fingerprint portions of the spectrogram based the signal intensity relative to a signal-to-noise ratio of the spectrogram meeting or exceeding a threshold value. By comparing the identified fingerprint to the characteristic feature database 312, the signal processor module 310 may demine the object to be a small private (e.g., a Cessna 172) aircraft, or another aircraft within a similar class. As discussed above, the signal processor module 310 may employ beamforming processing to locate a direction of a sound and/or to track movement of a source of the sound.

Additionally, or alternatively, a multispectral sensor 320 may capture electromagnetic energy reflected or emitted for an object to identify specific characteristics of the object. For example, a polymer-based coating unique to a particular design or type of aircraft may reflect a specific wavelength of electromagnetic energy. The multispectral sensor 320 may identify a fingerprint from the captured electromagnetic energy reflected by the coating, via the signal processor module 310, and comparison of the fingerprint to the characteristic future database 312 may result in identification of the object.

The flight management system 300 may further identify the object's performance parameters with reference to a performance parameter database module 314. The flight management system 300 may cross-reference the determined object-type of the identified object with a performance parameter database module 314 to determine the identified object's performance parameters. For example, the performance parameters may include, rate of climb and/or decent, the aircraft's operating ceiling, range, speed, maneuverability, and/or flight envelope of the identified object. For example, with reference to the identified small private aircraft above, the performance parameter database 314 may determine that the object has a cruise speed of 122 knots, a maximum speed of 163 knots, a service ceiling of 13,500 feet, and a rate of climb of 721 feet per minute. The flight management system 300 may use the performance parameters and operating characteristics of the object to determine a trajectory envelope and update the UAV's flight plan.

The object trajectory module 308 may receive and analyze one or more images of the UAV's airspace, in conjunction with object identification results and determined object performance parameters from the signal processor module 310 to determine the current trajectory of an identified object 102, as well as the probability of a trajectory change, or trajectory envelope. For example, the identified small private aircraft may have a conical trajectory envelope and be scaled to reflect the small private aircraft's operating characteristics. Trajectory envelopes are discussed in further detail with respect to FIGS. 4 and 5.

The flight management system 300 may also comprise a wireless communication component 324 capable of maintaining a communication network (such as the communication network 122 shown in FIG. 1), or a P2P network, between a plurality of UAVs. For example, a UAV and one or more nearby UAVs operating within the UAV's airspace may transfer database information, object identification data, and/or data representing a captured signal from the UAV's airspace. Furthermore, an object located within the detection limits of multiple UAVs may allow for the triangulation of the objects position relative to the UAV network.

Figure 4:
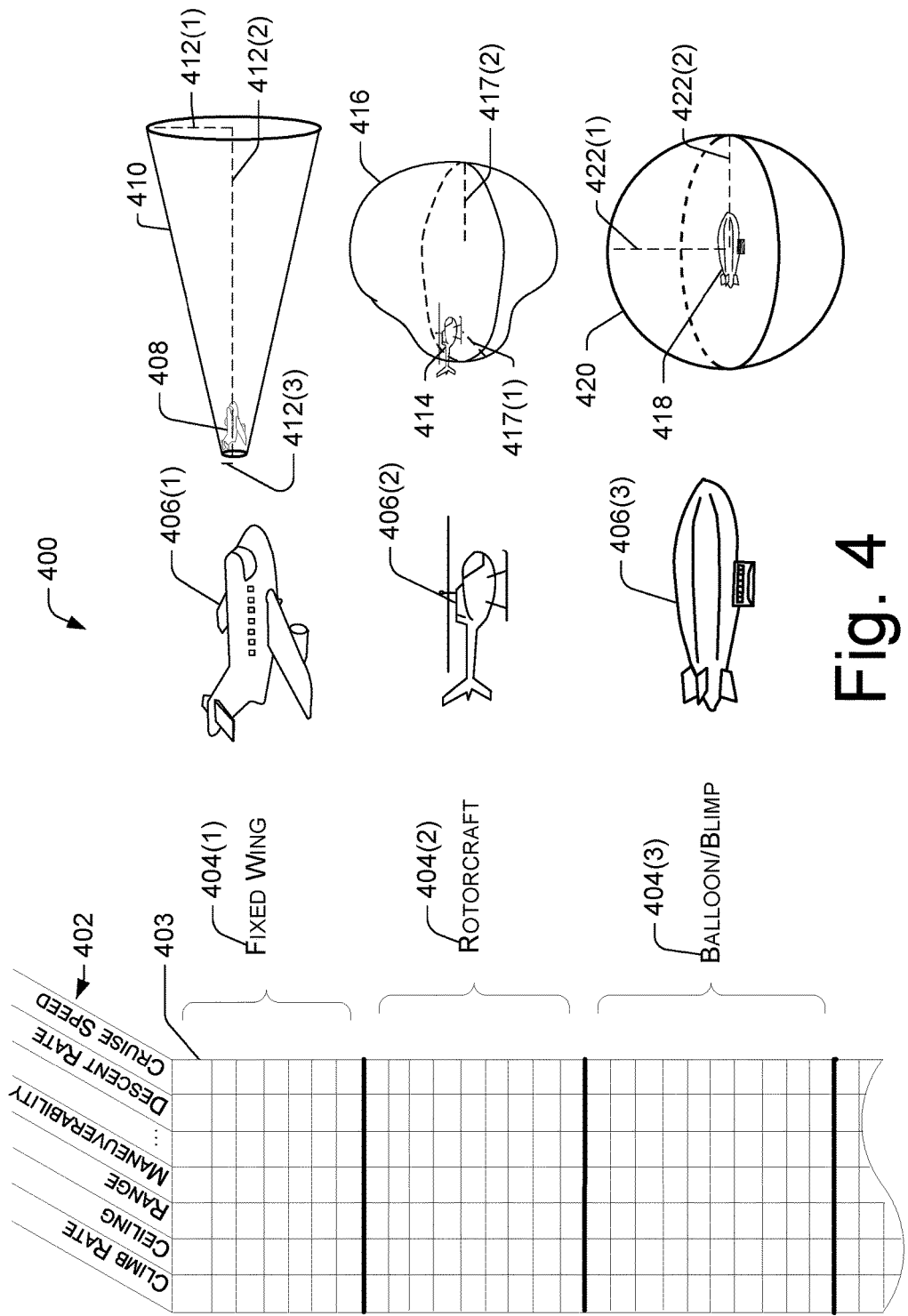
FIG. 4 is a schematic diagram of an illustrative performance parameter database to associate an identified object with characteristic performance parameters and a scalable trajectory envelope with the identified object.

FIG. 4 is a schematic diagram of an illustrative performance parameter database 400 to associate an identified object with characteristic performance parameters and a scalable trajectory envelope with the identified object. The database 400 may comprise of a plurality of performance parameters 402, such as climb rate, operating ceiling, range, maneuverability, decent rate, cruise speed, etc., and associated values 403. Every object maintained in the database 400 may have an associated value with each of the performance parameters 402. The objects may be further categorized based on the object-type 404, such as fixed wing 404(1), rotorcraft 404(2), balloon/blimp 404(3), stationary object, etc. In some embodiments, the database 400 may include specific aircraft and/or objects, such as specific models of aircraft. Each object-type 404 may have one or more subcategories further identifying the object with increasing specificity. For example, "fixed wing" may be further subdivided into "commercial" and "private pilot" and further again into "commercial-cargo" and "commercial-passenger." Furthermore, each object-type 404 may be represented by one or more visual representations 406. The one or more visual representations may be used for identification of the structural features of an identified object. Additionally, the database 400 may comprise a scalable trajectory envelope for each object type. The scalable trajectory envelope may reflect a probability of trajectory change of the object based on one or more performance parameters 402 such as maneuverability, speed, or operating ceiling, for example, and associated performance values 403 of the identified object.

A trajectory envelope profile may be characterized as scalable volume representing the trajectory envelope. The scalable volume may be scaled based on an identified object's operating characteristics, such as speed and/or acceleration, historic information available for the object's trajectory. For example, a scaling factor may be sized to reflect a predictability factor associated with the object within the UAV's airspace. Furthermore, if the trajectory of a detected object has changed in excess of a threshold amount and/or in excess of a threshold number of instances within the UAV's airspace over the course of a predetermined amount of time, the scaling factor will be larger than if the object's trajectory is constant over the same predetermined amount of time. The predictability factor may approach a value of "1" for an object that is likely to maintain a constant trajectory based on historical data.

A scalable volume may be characteristic of the object type. For example, a fixed wing 408 aircraft's performance parameters generally result in a relatively constant flight path outside of takeoff, landing, and altitude changes to avoid turbulence or other aircraft. Therefore, the resulting scalable volume 410 may result in a conical-like scalable volume 410 reflecting the relatively moderate maneuverability of the aircraft and relatively narrow speed and acceleration envelope of the aircraft. The scalable trajectory envelope may be described mathematically by dimensional characteristics 412. The dimensional characteristics may be scaled to represent the operating characteristics of the object.

Similarly, a rotorcraft 414, having higher maneuverability relative to a fixed wing aircraft 408 may have a teardrop-like scalable volume 416. A teardrop-like volume may represent the capability of the rotorcraft to rapidly change direction, speed, and/or acceleration. The rotorcraft's scalable volume 416 may be mathematically represented by similar dimensional characteristics 417 that may be scaled to reflect the rotorcraft's operating characteristics.

A third example, a balloon or blimp 418, may have a relatively small spherical scalable volume 420, reflecting the object's narrow performance parameters such as speed and maneuverability. The volume 420 may be spherical reflecting the blimp's unpredictability relative to a fixed wing aircraft 408 or rotorcraft 414, for example. The spherical shape may be represented by dimensional characteristics 422 and scaled to reflect the blimp's operating characteristics.

Figure 5:
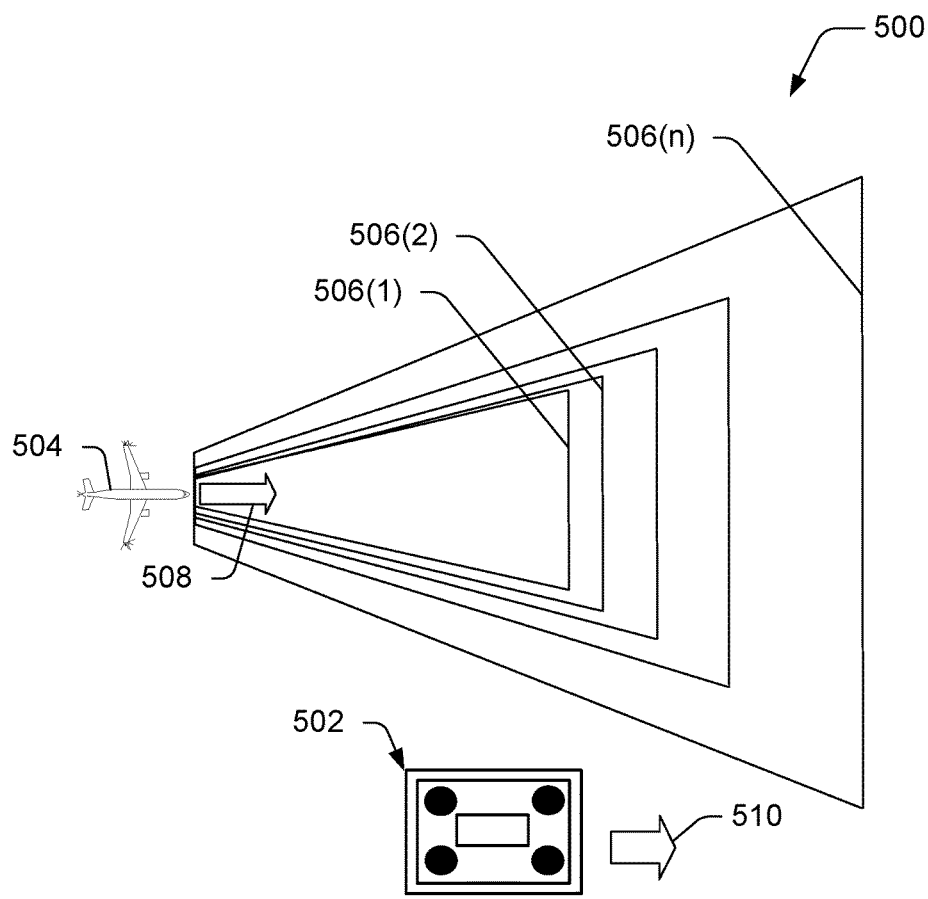
FIG. 5 is a schematic diagram of a UAV airspace indicating probability derived maps representing an object's current position, trajectory, and likelihood of trajectory change at a future time.
Figure 5:
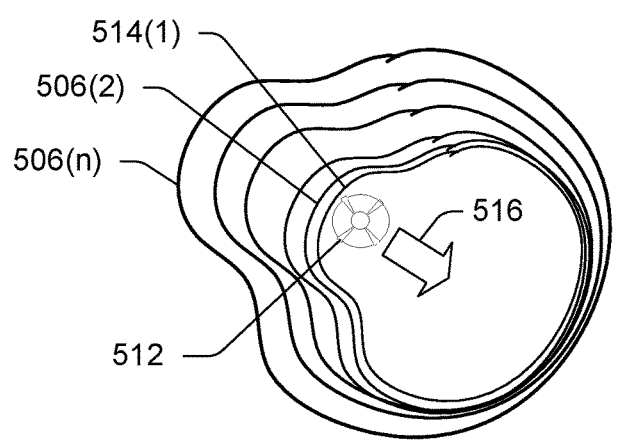

FIG. 5 is a schematic diagram of a UAV airspace indicating probability-derived maps 500 representing an object's current position, trajectory, and likelihood of trajectory change at a future time. For example, the UAV's flight management system 300 may identify an object as a fixed wing aircraft 504 and then determine a three-dimensional trajectory envelope represented by a conical-like shape and scaled to represent the object's current operating characteristics 508. The trajectory envelope may be further represented as a three-dimensional isoprobability (i.e., constant probability) trajectory map. The density of isoprobability lines of the trajectory map represents the varying probability of finding the object 508 at any given point within the volume described by the trajectory envelope. For example, a point with dense isoprobability lines may indicate a high likelihood of trajectory change at that point relative to the current trajectory.

For example, the probability of finding a fixed wing aircraft's location at some point in the future may be described by 1 to n isoprobability lines 506. The probability of trajectory change in close proximity to the object's current position 506(1) may be relatively low. An inverse relationship may be stated as the likelihood that the object will be located at a point close to the object's current position is relatively high. However, at a point further from the current position 506(n), the probability of a trajectory change is relatively high compared to the closer position 506(1), and therefore the likelihood of finding the fixed wing aircraft 504 at the further point 506(n) in the future is lower.

A rotorcraft object 512, however, may be more maneuverable than a fixed wing aircraft 504, and therefore more unpredictable. In the rotorcraft example, the isoprobability lines far forward of the rotorcraft 512 may be more compressed representing a high likelihood that the rotorcraft may change trajectory. Isoprobability lines aft and at 90 and 180 degrees from the current trajectory may be less dense reflecting the rotorcraft's 512 ability to change course rapidly, while factoring in the probability that the rotorcraft 512 will maintain its current operating characteristics 516 (i.e., the rotorcraft is more likely to change forward direction in the long-term rather than short term).

The UAV's flight plan management system 300 may compare the UAV's current operating characteristics 510 and flight plan 132 to the current operating characteristics of one or more objects in the UAV's airspace 100 as well as probability maps associated with each object to determine the lowest risk flight plan for the UAV 502. In this way, the UAV 502 may manage risk to varying degrees relative to the UAV's airspace 100. For example, in more controlled environments, such as a payload pick-up location, the risk taking ability of the UAV 502 may be increased to reflect the additional control mechanisms in place within environment.

In some instances, the level of risk associated with the flight plan may include consideration of filed flight plans with the governing body, such as the Federal Aviation Administration. Filed flight plans may include aircraft identification, equipment type (i.e., object type), cruise speed, flying time, etc. The UAV's flight plan management system 300 may interrogate a database of filed flight plans for aircraft to factor into a risk assessment, a likelihood of interaction between the UAV's flight plan 132 and the filed flight plan of an object in the UAV's airspace 100.

The UAV operator may wish to significantly reduce or eliminate any risk taking ability of the UAV 502 in regulated airspace during payload delivery to ensure safety. This may result in the UAV 502 suspending its flight plan to accommodate busy airspace where the UAV 502 may not determine a sufficiently risk-free flight plan.

Figure 6A:
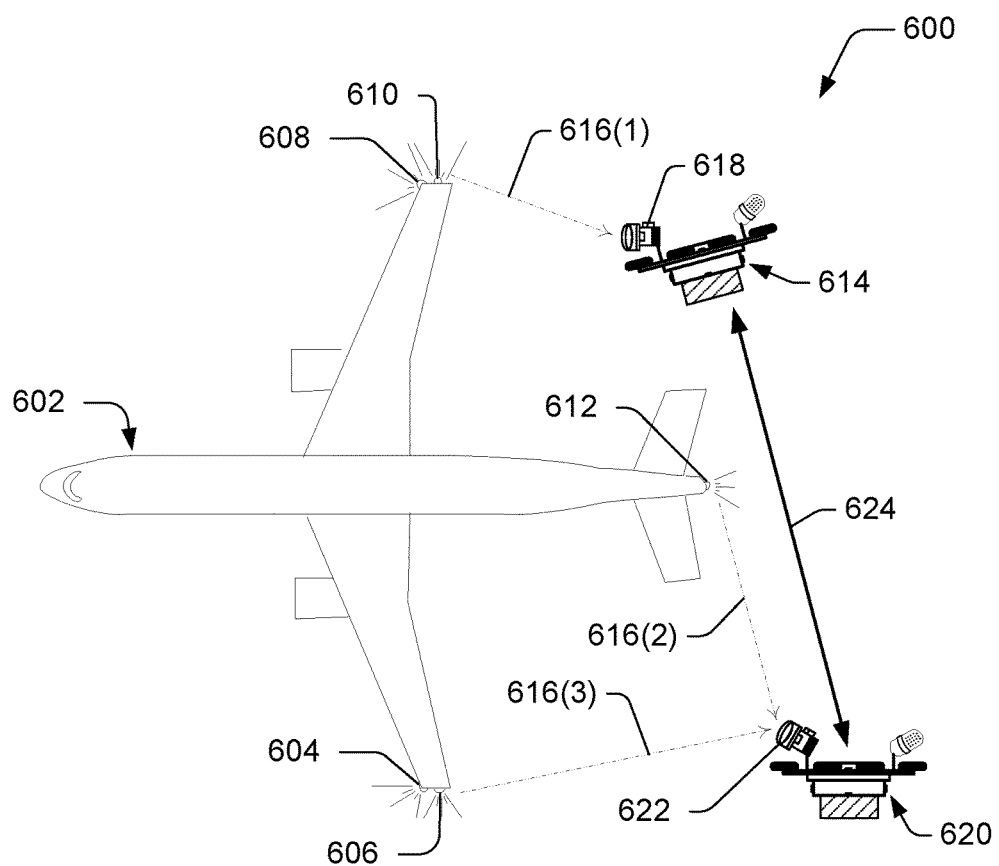
FIG. 6A is a pictorial plan view representing a UAV airspace, including an aircraft with a representative lighting system including navigational and anti-collision lights. The representation further depicts multiple UAVs detecting the aircraft while maintaining network communication between the UAVs.
Figure 6B:
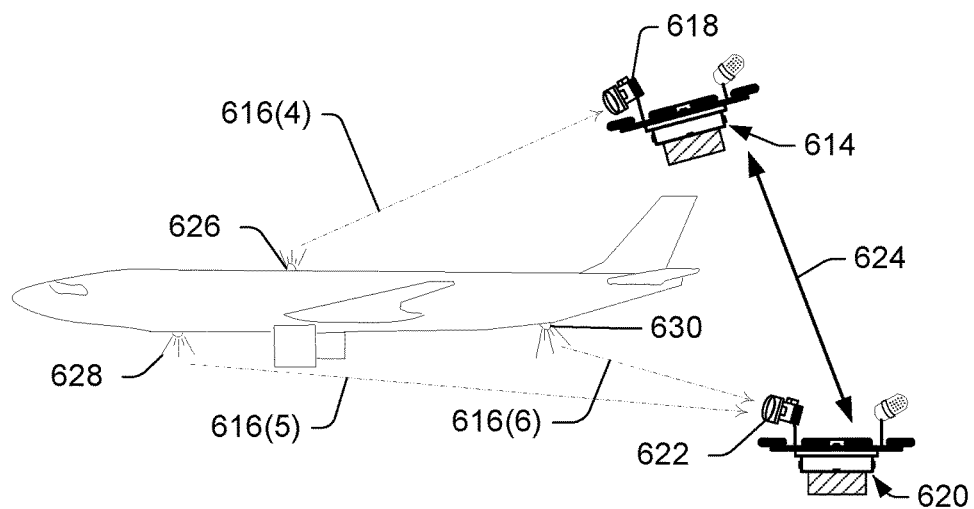
FIG. 6B is a pictorial side view of the aircraft of FIG. 6A.

FIG. 6 is a pictorial plan view representing a UAV airspace, including an aircraft with a representative lighting system including navigational and anti-collision lights 600. These lighting systems of a detected aircraft 602 may include a red 604 and white 606 light on the left side of the aircraft. A green 608 and white 610 light on the right side of the aircraft and a white light 612 at an aft portion of the aircraft—typically on the aircraft's tail. Additionally, the aircraft may have white lights on the top of the aircraft's midsection 626. Further, the aircraft may have a white light 630 on an aft portion of the aircraft's fuselage as well as an anti-collision light 628 typically located forward of the wings and propulsion system and on the aircraft's fuselage. The intent of the lighting system is generally to increase visibility of the aircraft from all directions during low visibility situations such as fog/clouds or at night.

As discussed above with respect to FIG. 3, the optical sensor 316 of the flight management system 300 may capture the relative location, flashing frequency and/or rotating frequency of aircraft lighting system 600. For example, the anti-collision lighting 618 may have a rotating frequency between 40 and 100 cycles per minute. By comparing the location and/or frequency to the characteristic feature database 308, the flight management system 300 may identify the object-type and further determine object operating characteristics and a trajectory envelope for the object.

When multiple UAVs are operating in the same airspace, they may establish a peer-to-peer network 624 to share information about their detected environments. For example, a first UAV 614 may have visibility of the green 608 and white light 610 on the right side of the detected aircraft 602 as well as the top white light 626. The first UAV 614 may capture a plurality of images 616 using an optical sensor 618.

A second UAV 620 may have direct visibility to the aft white light 612, left side red 604 and white 606 lights, as well as the aft white light 630 and anti-collision light 628. The second UAV 620 may capture a plurality of images 616 using its optical sensor 622. Furthermore, each UAV may share captured images and processed data with the other UAVs operating within the network 624. Data sharing is further described with respect to the multi-UAV communication network illustrated in FIG. 7.

Figure 7:
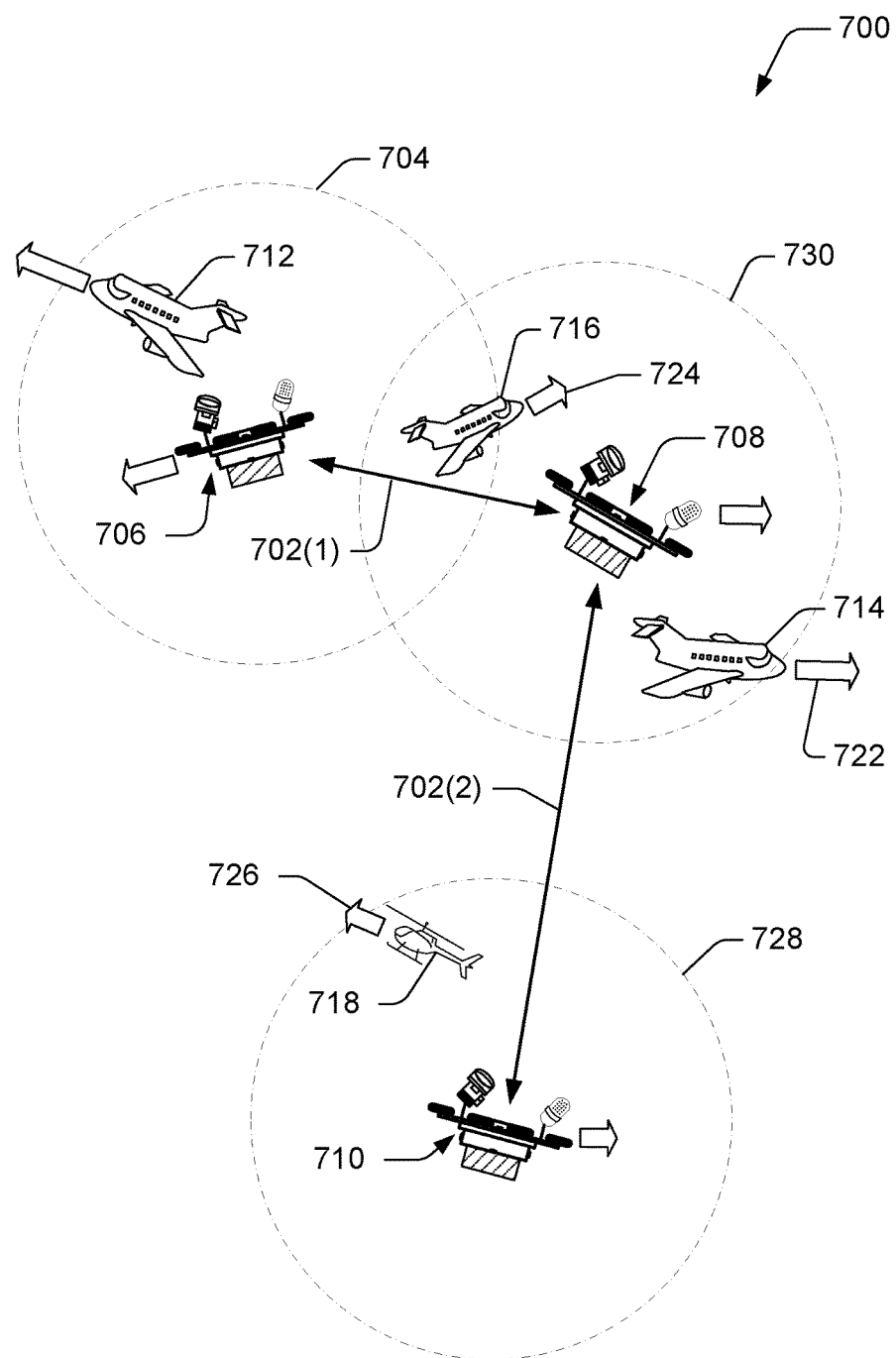
FIG. 7 is a schematic diagram representing a plan view of a UAV's airspace and illustrating a UAV peer-to-peer (P2P) communication network capable of extending the detection limits of individual UAVs and increasing the signal strength of individual UAVs within the network.

FIG. 7 is a schematic diagram representing a plan view of a UAV's airspace and illustrating a UAV peer-to-peer (P2P) communication network 700 capable of extending the detection limits of individual UAVs and increasing the signal strength of individual UAVs within the network. Two or more UAVs may be in communication via a P2P network 702 for example wherein the two or more UAVs may exchange information related to detected objects within their respective detection limits. A UAV may thereby extend the reach of its detection limits to include the detection limits of one or more additional UAVs, via the P2P network 702. Additionally, the network of UAVs may improve the accuracy of the any individual UAV within the network 702 and provide data to triangulate the position of objects relative to the UAVs of the network where the object is within the detection limits of multiple UAVs.

For example, the communication network 700 may include 1 to n UAVs and a plurality of objects operating within the airspace. A first UAV 706 of the network may have a detection limit 704 associated with the reach of its sensors. Further, the UAV 706 may have one or more objects within its detection limits 704. For example, this may include multiple fixed wing aircraft, one operating within the detection limit of only the first UAV 706 and the second fixed wing aircraft 716 operating within the detection limits of both the first UAV 706 and a second UAV 708. The second UAV 708 having a detection limit 730 associated with the detection capabilities of its sensors.

The first UAV 706 may detect and identify the two objects as well as determine the operating characteristics of each object as discussed above. Further, the first UAV 706 may determine a trajectory envelope for each object as discussed above with respect to FIGS. 4 and 5. The second UAV 708 may also detect the second fixed wing aircraft 716 and determine its operating characteristics 724 as well as a trajectory envelope for the object. The P2P network 702 may transfer operating characteristic data determined by the first and second UAV between the two UAVs. With the additional data, each UAV may update its determined operating characteristics and trajectory envelope. Furthermore, each UAV may use data collected from the other, with the position of the two UAVs being known relative to the network, to triangulate the location of the aircraft 716 relative to the two UAVs.

In addition to the second aircraft 716, the second UAV 708 may detect and identify a third fixed wing aircraft 714 and the operating characteristics of the aircraft 722. Since the third aircraft 714 is outside of the detection limits 704 of the first UAV 706, the second UAV 708 may pass information relating to the third aircraft 714, such as operating characterizes 722 to the first UAV 706 via the P2P network 702. This may give the first UAV 706 greater visibility of objects operating outside of its detection limits 704.

Likewise, an n-th UAV 710 may have a detection limit 728 associated with its sensors outside of the detection limits of either the first or second UAV. The n-th UAV 710 may share operating characteristic 726 of an object 718 detected within its detection limits 728 with one or more UAVs within the P2P network 702 to improve visibility of the airspace beyond the detection limits of each UAV operating in the P2P network.

In some embodiments, the first UAV 706 may improve the accuracy of its detection scheme by sharing information over the P2P network 702. For example, when an object 716 is located at the outer detection limits 704 of the first UAV 706 and the object 716 may only be detectable by low energy signals collected by the UAV's sensors the first UAV 706 may rely on higher energy signals captured by the second, closer UAV 708. Data sharing may be triggered when the signal-to-noise (SN) ratio of signals captured by a UAV approach one and when a nearby UAV captures a signal with a higher SN ratio and is operating within the same P2P network 702.

Figure 8:
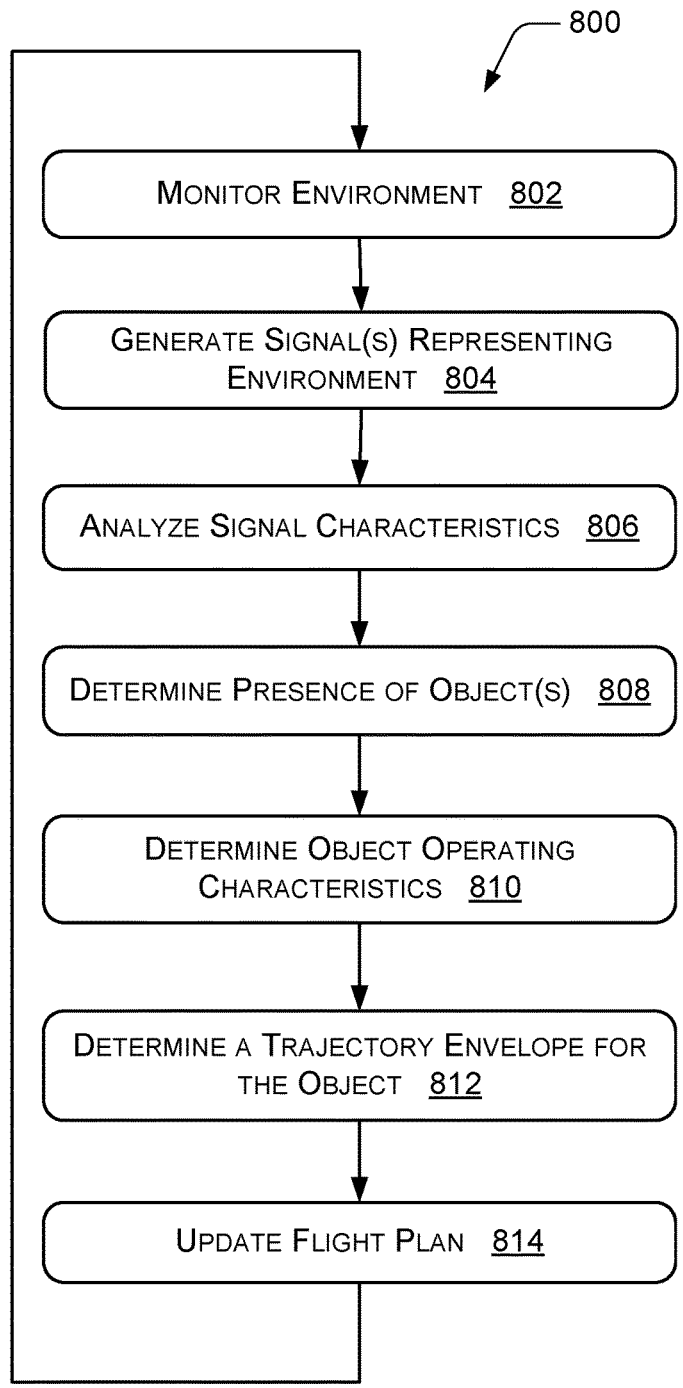
FIG. 8 is a flow diagram of an illustrative process for detecting and identifying an object and managing a UAV flight plan.

FIG. 8 is a flow diagram of an illustrative process for detecting and identifying an object and managing a UAV flight plan 800. The order in which the operations are described is not intended to be construed as a limitation, and any number of the described blocks can be combined in any order and/or in parallel to implement the processes. The process 800 is described with reference to FIGS. 1 and 3.

At 802, the UAV 114 captures, via its one or more sensors, signals representing the UAV's airspace 100. The UAV 114 may capture one or more object detectable signals 106 generated from an object 102 operating in the UAV's airspace 100. The sensors may include the optical sensor 316, the acoustic sensor 318, and/or the multispectral sensor 320, for example. If the object is an aircraft, the acoustic sensor 318 may capture one or more acoustic signals generated by the aircraft's propulsion systems, for example. Additionally, the aircraft may emit a thermal signature from heat generated by the aircraft's propulsion systems and detectable by an optical sensor 316 capable of electromagnetic energy in the infrared spectrum. Furthermore, the optical sensor 316 may collect visible images representing the UAV's airspace 100.

The multispectral sensor 320 may receive electromagnetic signals reflected from objects to create a multispectral image. The multispectral image may be used to determine specific structural features, such as coating types, material types, etc. that make up the object and which reflect a specific energy signature. Unique structural features associated with the object may be used to identify the object.

Furthermore, the multispectral sensor may receive a broad spectrum of electromagnetic energy, but only specific bands within that spectrum may be analyzed by the signal processor 310 at 804. For example, an object likely to be operating in the UAV's airspace and included in the characteristic feature database 308 may have a known spectral signature stored in the characteristic feature database 308. The spectral signature may include one or more specific bands of electromagnetic energy that are uniquely associated with the object. Therefore, the signal processor module 310 may receive the entire spectrum or only portions, or bands, of whole spectrum. The bands are associated with the known spectral signature of the object likely to be present in the UAV's airspace. Likewise, the signal processor module 310 may analyze the entire spectrum or only the bands associated with objects likely to be present in the airspace.

At 804, a signal processor module 310 may receive signals generated from the sensors, the signals representing the captured sensor data in a format that may be analyzed in an operation 806. Furthermore, the signal processor module 310 may process the received signals to identify and exploit characteristic features present in the signals. Additionally, the signal processor module 310 may receive signals generated from the sensors of another UAV operating in the UAV's airspace and transmitted to the UAV over a peer-to-peer network. For example, the signal processor module 310 may identify portions of the signal that meet or exceed a threshold value based on signal intensity relative to a signal-to-noise ratio of the full signal.

At 806, the signal processor module 310 may analyze the generated signal for characteristic features. A characteristic feature may be a unique spectral fingerprint of infrared energy, or an acoustic pattern represented by one or more unique time-frequency characteristics of the spectrogram. The signal processor module 310 may also have the data representing the generated signal via a wireless communication component to a remote server for analysis (e.g., uploaded and analyzed to a cloud server or dedicated server).

The signal processor module 310 may then determine the presence of one or more objects in the airspace at an operation 808. The signal processor module 310 may accomplish this by comparing the characteristic features of the generated signal to a characteristic feature database 312 and matching the identified features to database features 312 of known object generated signals. When characteristics features of the generated signal are similar to one or more characteristic features in the characteristic feature database 312 the signal processor module 310 may identify the object based in part on the likelihood of finding the object in the UAV's airspace. For example, a UAV operating in Seattle, Wash. may associate characteristic features of a fixed wing object to a floatplane due to the prevalence of floatplanes in the region. However, a UAV operating in Tempe, Ariz. may or may not associate features with floatplane characteristics characteristic feature database 312 due to the marginal likelihood of the UAV encountering a floatplane in the desert.

The characteristic feature database module 308 may compare key features of the received signal to the database and thereby identify the object. Depending on the strength and quality of the received signal, the characteristic feature database module 308 may return a specific object identification, for example, a floatplane identified as a de Havilland Canada DHC-3 Otter. Where low signal strength or low signal-to-noise conditions exist, the characteristic feature database module 308 may return only an object-type. For example, the signal database module may return an identification as a "fixed-wing" or more specifically a "floatplane" object type. Additionally, the characteristic feature database module 308 may return no-identity or null identify.

At 810, the UAV 114 determines the object's operating characteristics 104 based on sensor data and identification of the source from the signal processor module 310. For example, a UAV 114 may monitor one or more object detectable signals 106 and determine the object's operating characteristics 104 based on changes in the signal strength and/or directionality over time.

At 812, the UAV 114 may determine a trajectory envelope for the object 102. The object trajectory module 308 may look up one or more performance parameters associated with the identified object 102 from a performance parameter database 314. Performance parameters may include maximum speed, operating ceiling, maneuverability, etc. The object trajectory module 308 may factor in the object's performance parameters to determine the likelihood that the object will change its trajectory relative to the UAV. This likelihood of trajectory change may then be used to determine the shape and size of the trajectory envelope for each object that is identified by the UAV. This is described in detail with respect to FIGS. 4 and 5.

For example, if the object identified at the operation 806 is a DHC-3 Otter, the object trajectory module 308 may determine a moderate likelihood of trajectory change based on the relative maneuverability of that specific aircraft. The resulting trajectory envelope may be a conical shape, the dimensions of which may be proportional operating characteristics of the DHC-3 Otter.

At step 814, the UAV may apply the trajectory envelope from the operation 810 to update the UAV's flight plan 132. For example, if the UAV's current flight characteristics 112 are likely to intersect with a determined trajectory envelope, the UAV 114 may update its flight plan 132 to minimize or eliminate the likelihood of interference with the object 102. Furthermore, the UAV 114 may consider features of its own flight plan 132 in determining an updated flight plan that is optimized with respect to distance to a destination 130, payload weight, remaining fuel, proximity of charging stations, and/or distance traveled from a base location 128, among other factors. In some situation, a UAV 114 may be required to suspend operation due to a crowded airspace 100. A UAV 114 may also determine a flight plan 132 to return to a base location 128 is required due to insufficient fuel, unavailable fueling station, and/or high likelihood of interference with an identified object 102, for example.

The UAV 114 may constantly monitor collected signals as described in process 800 throughout the UAV's operation.

Figure 9:
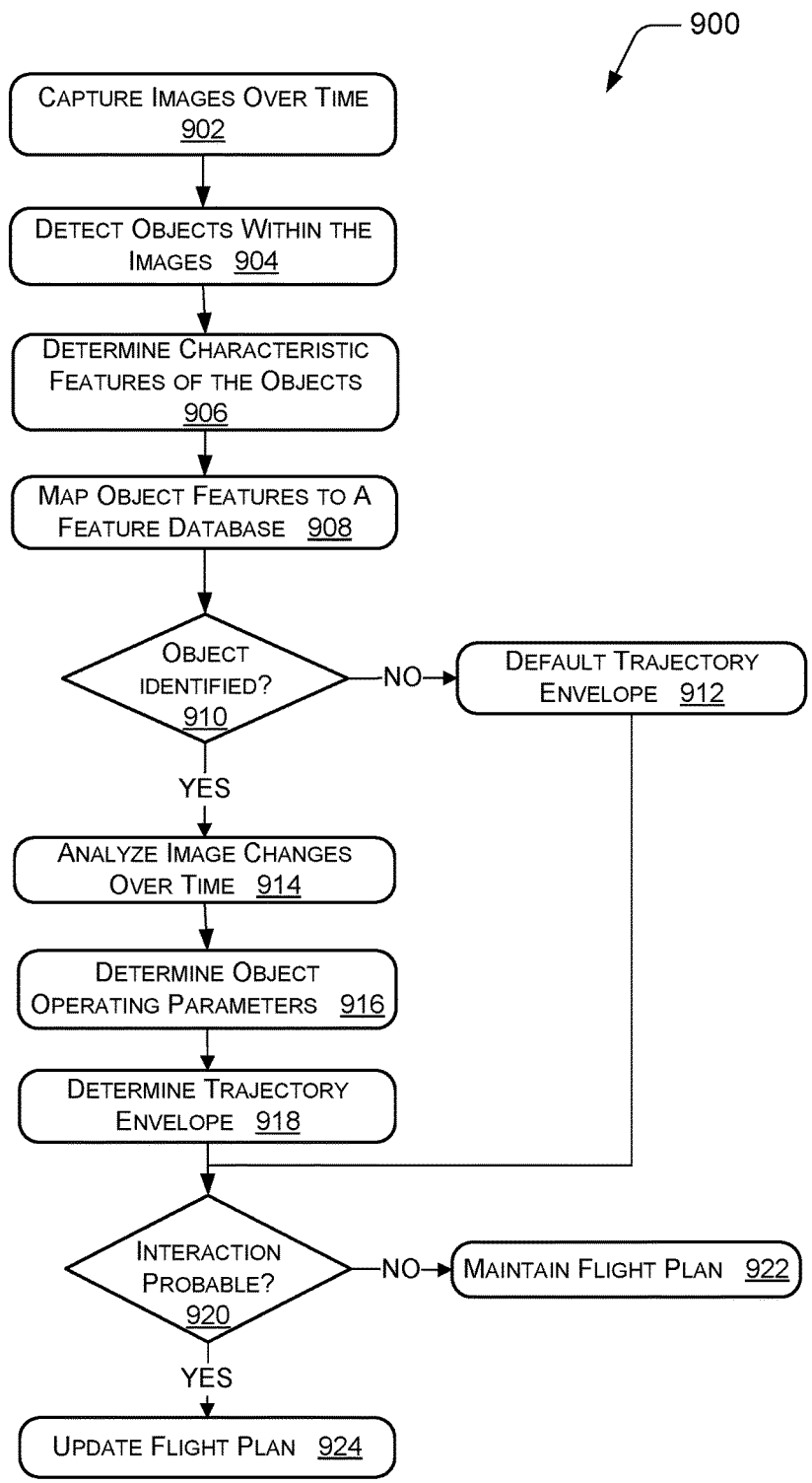
FIG. 9 is a flow diagram of an illustrative process for detecting and identifying an object and managing a UAV flight plan using images representing the UAV's airspace.

FIG. 9 is a flow diagram of an illustrative process for detecting and identifying an object and managing a UAV flight plan using images representing the UAV's airspace. The process 900 may be periodic or continuous depending on factors such as fuel level, congestion in the UAV's airspace 100, or operator preferences for risk level, for example. The order in which the operations are described is not intended to be construed as a limitation, and any number of the described blocks can be combined in any order and/or in parallel to implement the processes. FIG. 9 is discussed with reference to FIGS. 1 and 3.

At 902, the UAV's optical sensor 124 collects one or more images representing the UAV's airspace 100 over a period of time. The time period may be determined relative to the quality of the data received (i.e., signal strength or signal to noise ratio) or if no object 102 is detected within the images. Therefore, the time period may be longer if low quality data is received by the optical sensor 124 and the time period may be shorter if the quality of data is relatively good.

At 904, the UAV's signal processor module 310 may analyze the collected images to determine the presence of one or more objects. For example, the image may contain a plurality of lights representing the detected object's navigational lights or anti-collision lights.

At 906, signal processor module 310 may compare the determined characteristic features to a characteristic feature database 312 of known object sources. The comparison may result in a positively identified object at step 910. However, if no object is identified, a null value is returned to the object trajectory module 308 resulting in a default trajectory envelope at 912. The default trajectory envelope may ensure a desired safety factor.

At 916, the signal processor module 310 compares changes in the object within the captured images over a predetermined period of time to determine operating characteristics 104 of the object 102. For example, changes in the images relative to the UAV 114 may indicate the trajectory of the object 102, speed, and/or acceleration of the object relative to the UAV 114.

If an object 102 is identified by comparison of features to a characteristic feature database 312, the identified object 102 may be associated with object performance parameters from a performance parameter database 314 at step 918. The association may be done by a lookup table that associates the identified object with one or more performance parameters such as maximum rate of climb and rate of descent, the identified object's operating ceiling, rang, maximum speed and/or overall maneuverability, for example. The performance parameter database 314 may also include one or more scalable volume as described above with respect to FIG. 4.

At 920, the flight plan manger module 306 may compare the determined trajectory envelopes of the object 102 to the UAV's dynamic flight plan 132 to determine a likelihood of interaction. The trajectory envelope may be a default envelope from 912. The UAV 114 may update its dynamic flight plan 132 to minimize the likelihood of interaction and optimize the flight plan 132 between the UAV's base location 128 and one or more destination locations 130.

Figure 10:
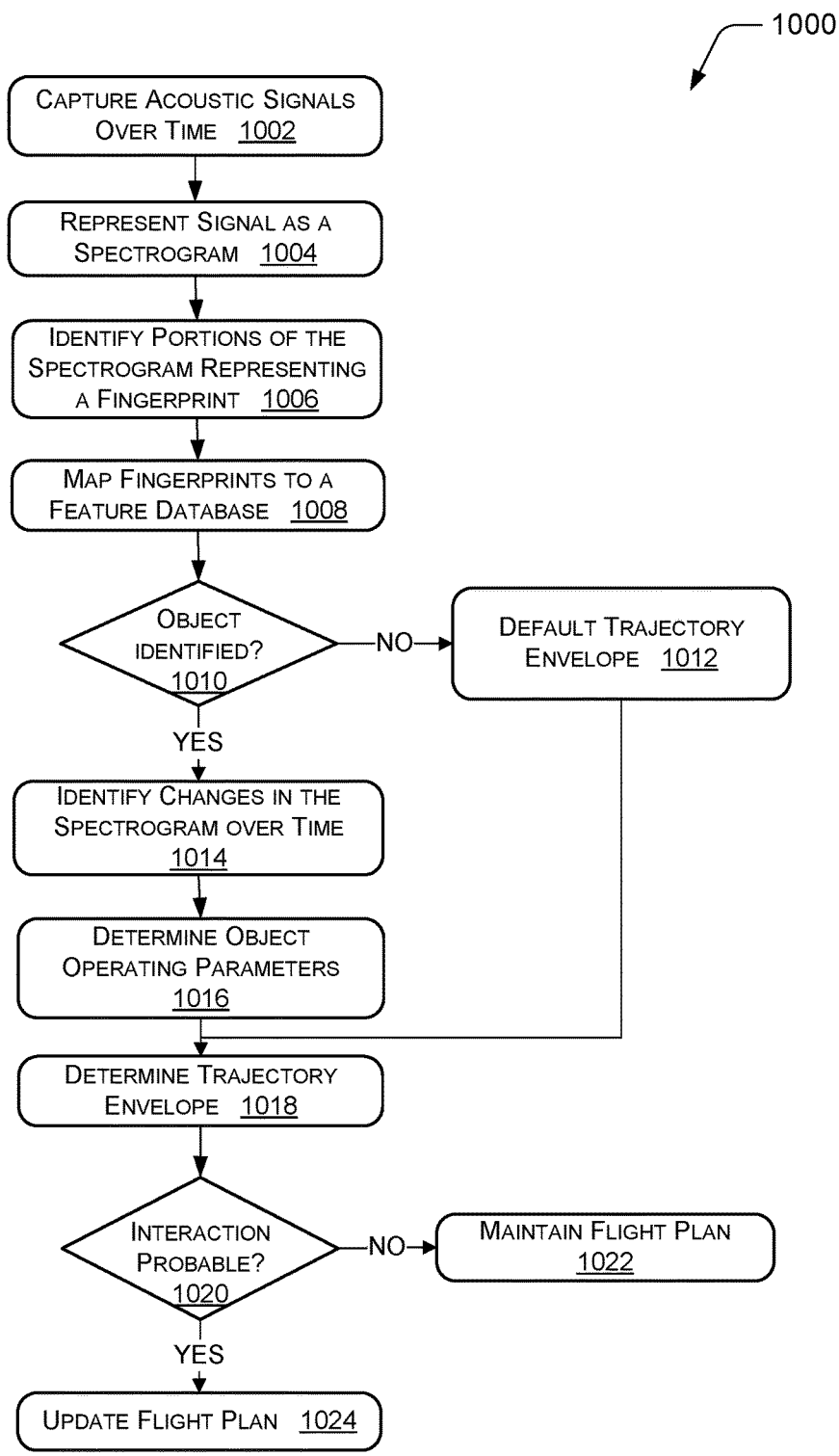
FIG. 10 is a flow diagram of an illustrative process for detecting and identifying an object and managing a UAV flight plan using acoustic signals representing the UAV's airspace.

FIG. 10 is a flow diagram of an illustrative process for detecting and identifying an object and managing a UAV flight plan using acoustic signals representing the UAV's airspace. At 1002, an acoustic sensor 126 may receive object generated or reflected acoustic signals. The acoustic sensor 126 may be in the form of an array assembly of sensors capable of detecting the directionality of the captured acoustic signal. The order in which the operations are described is not intended to be construed as a limitation, and any number of the described blocks can be combined in any order and/or in parallel to implement the processes.

At 1004, the signal processor module 310 may represent the signal as a spectrogram of signal intensity, time, and frequency. The signal processor module 310 may identify portions of the spectrogram that represent unique fingerprints, or signatures, of the captured acoustic signal at 1006. For example, the signal processor module 310 may identify fingerprint portions of the spectrogram based the signal intensity relative to a signal-to-noise ratio of the spectrogram meeting or exceeding a threshold value.

Furthermore, the range of signal-to-noise ratio that is considered significant may vary depending on the quality of the signal (i.e., strength and overall signal-to-noise ratio). Additionally, if no significant features are identified, the signal processor module 310 may widen the range of signal-to-noise ratios considered significant. Further, the signal processor module may also widen the range of signal-to-noise ratios if no object is identified at step 1010.

At 1008, the signal processor module 310 may map the fingerprints to a feature database to identify the object 102 at 1010. However, if no object is identified, a null value is returned to the object trajectory module 308 resulting in a default trajectory envelope at 1012. The default trajectory envelope may ensure a desired safety factor.

At 1014, the signal processor module 310 may identify changes in the spectrogram over a predetermined period of time in order to determine operating characteristics 104 of the identified object 102. For example, changes in the intensity or directionality of the captured acoustic signal may indicate the trajectory, speed, and/or acceleration of the object 102 relative to the UAV 114.

Identification of the object at 1010 may also be used by the object trajectory module 308 to associate performance parameters with the identified object 102 at 1016. For example, the object trajectory module 308 may look up the identified object 102 in a performance parameter database 314 and associate performance parameters with the identified object 102. The object trajectory module 308 may determine a trajectory envelop at 1018 based at least in part on the object's operating characteristics 104 and associated performance parameters.

At 1020, the object trajectory module 308 may determine whether interaction between the UAV's flight plan 132 and the object's trajectory envelop is probable. The trajectory envelope may be a default envelope from 1012. If an interaction is not probable, the UAV 114 may maintain its current flight plan 132 at 1022. However, if interaction is determined to be probable, the UAV 114 may update its dynamic flight plan 132 at 1024 to minimize the likelihood of interaction and optimize the flight plan 132 between the UAV's base location 128 and one or more destination locations 130.

Figure 11:
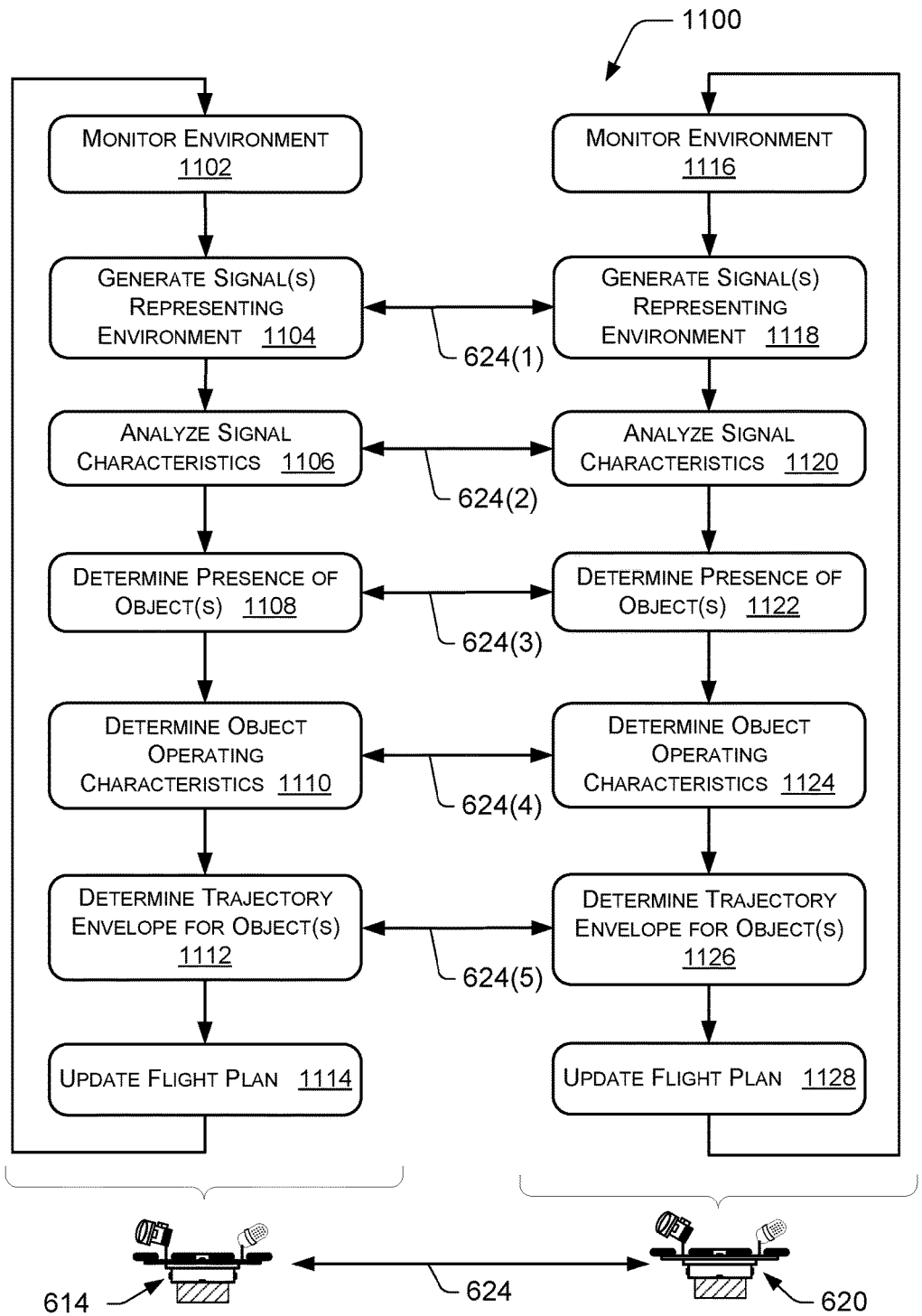
FIG. 11 is a flow diagram of an illustrative process for detecting and identifying an object and managing a UAV flight plan showing the exchange of information over a multi-UAV communication network.

FIG. 11 is a flow diagram of an illustrative process for detecting and identifying an object and managing a UAV flight plan showing the exchange of information over a multi-UAV communication network 1100. The order in which the operations are described is not intended to be construed as a limitation, and any number of the described blocks can be combined in any order and/or in parallel to implement the processes. FIG. 11 is described with reference to FIG. 6.

For example, operations 1102-1114 and 1116-1128 each mirror the process steps described in FIG. 8. Operations 1102-1114 are conducted by the flight management system aboard a first UAV 614 and steps 1116-1128 are conducted by the flight management system aboard a second UAV 620. At operations 1104, 1106, 1108, 1110, and/or 1112 the first UAV 614 may provide information to the second UAV 620 and vice versa via a communication network 624.

For example, the first UAV 614 may provide raw signal data or analyzed signal characteristics at step 1106 to the second UAV 620. The second UAV 620 may receive or reject the data based on its own captured signal quality. For example, if the second UAV 620 determines the signal strength, or signal-to-noise ratio, of its own signal is too low, the second UAV 620 may accept the data from the first UAV 614 via the network interface 624.

In some embodiments, the first UAV 614 may receive the analyzed signal characteristics from the second UAV 620 at 1120. The second UAV 620 may not perform the operations 1122-1128 in this scenario, but may just pass information to the first UAV 614 for processing. The first UAV 614 may accept or reject the data received from the second UAV 620. If the First UAV 614 accepts the information, the first UAV 614 will incorporate the analyzed signal characteristics from the second UAV 620 to determine a trajectory envelope for one or more objects identified at 1108. Further, the first UAV 614 may share the determined trajectory envelope for the one or more objects from 1112 to the second UAV 620. In this way, the second UAV 620 may act as a sensing UAV and relay analyzed sensor data to the first UAV 614. This may avoid duplication of effort. However, the second UAV 620 may independently determine the trajectory data.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:
   generating acoustic signals, by one or more acoustic sensors of an unmanned aerial vehicle (UAV), from acoustic waves generated by propulsion of a flying object;
   determining one or more characteristic features of the acoustic signals;
   identifying the flying object based at least in part on a comparison of the one or more characteristic features to a database of known acoustic signals;
   associating performance parameters with the flying object using a database that includes performance parameters for at least one of a plurality of flying objects or class of flying objects;
   determining a location and an airspeed associated with the flying object based at least in part on the acoustic signals;
   determining a trajectory envelope for the flying object based at least in part on the location, the airspeed and the associated performance parameters; and
   updating a flight plan for the UAV based at least in part on the trajectory envelope of the flying object, wherein the updated flight plan does not interact with the trajectory envelope of the flying object.

2. The method of claim 1, further comprising processing the acoustic signals using a beamformer to create beamformed acoustic signals prior to determining the location and the airspeed associated with the flying object, and wherein the determining the trajectory envelope for the flying object is performed using the beamformed acoustic signals.

3. The method of claim 1, wherein the identifying the flying object includes determining a class of the flying object, and wherein the associated performance parameters are for the class of flying objects.

4. The method of claim 1, wherein the trajectory envelope is based at least in part on one of a rate of climb, a rate of decent, or a maneuverability parameter associated with the flying object.

5. The method of claim 1, wherein the one or more characteristic features of the acoustic signals form a signal fingerprint in the form of a spectrogram over time, and wherein the one or more characteristic features are determined by a signal-to-noise ratio of the acoustic signals meeting or exceeding a threshold value.

6. An unmanned aerial vehicle (UAV), comprising:
   one or more processors;
   memory to store computer-readable instructions;
   one or more audio sensors coupled to the unmanned aerial vehicle (UAV), the one or more audio sensors to generate audio signals from sound received from an object within an airspace at least partially surrounding the UAV; and
   a flight management component stored within the memory that, when executed, causes the one or more processors to:
     receive the audio signals associated with the object;
     determine, based at least in part on an analysis of the audio signals, an identity of the object associated with audio signals;
     determine performance parameters for the object based at least in part on the identity of the object; and
     determine a trajectory envelope for the object based at least in part on the performance parameters.

7. The UAV of claim 6, wherein the flight management component is further configured to determine a location and airspeed associated with the object.

8. The UAV of claim 7, wherein the flight management component is further configured to process to the audio signals using a beamformer to generate beamformed audio signals, and wherein the location and the airspeed of the object is determined based at least in part on the beamformed audio signals.

9. The UAV of claim 6, wherein the flight management component is further configured to locate the object within a zone of a plurality of zones defined around the UAV.

10. The UAV of claim 6, further comprising a communication component to create a peer-to-peer network with one or more nearby UAVs, the communication component configured to exchange at least one of the audio signals, the identity of the object, or the trajectory envelope of the object with the one or more nearby UAVs.

11. The UAV of claim 10, where the flight management component is further configured to determine a location and airspeed associated with the object based at least in part on information exchanged from at least one of the one or more nearby UAVs using triangulation.

12. The UAV of claim 6, wherein the performance parameters are stored in a database and include at least a rate of climb, a rate of decent, and a maneuverability parameter associated with each of various objects.

13. The UAV of claim 6, wherein the identity of the object is a model of an aircraft, and wherein the performance parameters are associated with the model of the aircraft.

14. An object detection and avoidance system comprising:
one or more processors; and
memory storing computer-executable instructions that, when executed, cause the one or more processors to perform acts comprising:
generating audio signals from sound captured from an object;
identifying the object based at least in part on one or more characteristic features of the audio signals;
determining performance parameters for the object based at least in part on the identifying of the object; and
determining a trajectory envelope of the object based at least in part on the performance parameters.

15. The object detection and avoidance system of claim 14, wherein the acts further comprise updating a flight plan for an unmanned aerial vehicle (UAV) based at least in part on a probability of interaction between the UAV and the trajectory envelope of the object.

16. The object detection and avoidance system of claim 14, wherein identifying the object includes matching the one or more characteristic features of the audio signals with signal features stored in a database that associates individual signal features with respective objects or groups of objects.

17. The object detection and avoidance system of claim 14, further comprising determining an airspeed of the object based at least in part on changes in the audio signals over a defined period of time.

18. The object detection and avoidance system of claim 17, wherein the trajectory envelope is formed using a scalable volume that is scaled based in least in part on the airspeed and performance parameters of the object.

19. The object detection and avoidance system of claim 14, wherein the acts further comprise:
receiving at least some audio signals from one or more nearby UAVs; or
transmitting at least some of the generated audio signals to one or more nearby UAVs.

20. The object detection and avoidance system of claim 14, further comprising a multispectral sensor to capture specific wavelengths of electromagnetic energy reflected or emitted by the object and indicative of unique materials associated with the object, and further comprising identifying the object based at least in part on the specific wavelengths of electromagnetic energy reflected or emitted by the object.

* * * * *